United States Patent
Cheng (10) Patent No.: US 10,627,875 B2
(45) Date of Patent: Apr. 21, 2020

(54) TRANSPARENT DISPLAY PANEL, ITS MANUFACTURING METHOD AND TRANSPARENT DISPLAY DEVICE

(71) Applicant: BOE TECHNOLOGY GROUP CO., LTD., Beijing (CN)

(72) Inventor: Hongfei Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 92 days.

(21) Appl. No.: 15/679,990

(22) Filed: Aug. 17, 2017

(65) Prior Publication Data
US 2018/0081407 A1    Mar. 22, 2018

(30) Foreign Application Priority Data

Sep. 21, 2016    (CN) .......................... 2016 1 0840011

(51) Int. Cl.
| | |
|---|---|
| *G02F 1/1347* | (2006.01) |
| *G02F 1/1335* | (2006.01) |
| *G06F 3/0488* | (2013.01) |
| *G06F 1/16* | (2006.01) |
| *G02F 1/137* | (2006.01) |
| *G02F 1/13357* | (2006.01) |

(52) U.S. Cl.
CPC ........ *G06F 1/1692* (2013.01); *G02F 1/13471* (2013.01); *G02F 1/133555* (2013.01); *G06F 3/0488* (2013.01); *G02F 1/133615* (2013.01); *G02F 2001/13775* (2013.01); *G09G 2300/023* (2013.01)

(58) Field of Classification Search
CPC .......... G02F 1/13471; G02F 1/134309; H01L 27/3293
See application file for complete search history.

(56) References Cited

U.S. PATENT DOCUMENTS

| | | | |
|---|---|---|---|
| 6,421,039 B1 * | 7/2002 | Moon ............... | G02F 1/134363 345/100 |
| 8,009,249 B2 * | 8/2011 | Yoshihara ............. | G02F 1/1347 349/77 |
| 2001/0009508 A1 * | 7/2001 | Umemoto ............ | G02B 6/0038 362/615 |

(Continued)

*Primary Examiner* — Lucy P Chien
(74) *Attorney, Agent, or Firm* — Brooks Kushman P.C.

(57) ABSTRACT

The present disclosure provides a transparent display panel, its manufacturing method and a transparent display device. The transparent display panel comprises a first substrate, a second substrate, a third substrate, a first liquid crystal layer and a plurality of first pixels located between the first substrate and the second substrate; and a second liquid crystal layer and a plurality of second pixels located between the second substrate and the third substrate; the first liquid crystal layer has a larger refractive index than the first substrate and the second substrate; and the second liquid crystal layer has a larger refractive index than the third substrate and the second substrate; after applying voltages to one first pixel and one second pixel, a long axial direction of the first liquid crystal molecules is not parallel to a long axial direction of the second liquid crystal molecules; and at least part of a side surface of the transparent display panel is a light-entering surface.

17 Claims, 5 Drawing Sheets

(56) References Cited

U.S. PATENT DOCUMENTS

| | | | | |
|---|---|---|---|---|
| 2004/0246423 | A1* | 12/2004 | Sasabayashi | G02F 1/133707 349/130 |
| 2005/0123265 | A1* | 6/2005 | Kimura | G02F 1/133621 385/147 |
| 2005/0237444 | A1* | 10/2005 | You | G02B 6/0081 349/61 |
| 2009/0135368 | A1* | 5/2009 | Haseba | C09K 19/2007 349/183 |
| 2009/0201436 | A1* | 8/2009 | Strazzanti | B60K 35/00 349/16 |
| 2014/0028933 | A1* | 1/2014 | Chen | G02B 27/26 349/15 |

\* cited by examiner

TRANSPARENT DISPLAY PANEL, ITS MANUFACTURING METHOD AND TRANSPARENT DISPLAY DEVICE

CROSS-REFERENCE TO RELATED APPLICATION

This application claims priority to Chinese Patent Application No. 201610840011.X filed on Sep. 21, 2016, which is incorporated herein by reference in its entirety.

TECHNICAL FIELD

The present disclosure relates to the field of display technology, and in particular to a transparent display panel, a method for manufacturing the same, and a transparent display device comprising the same.

BACKGROUND

A transparent display device is a display device which can assume a transparent display state such that a viewer is able to see rear scenes thereof. It is usually applicable to department store display windows, perspective doors of refrigerators, front windshields of cars, vendors and other fields, and capable of producing display, interactive, and advertising and other synergistic effects. Due to its unique application scene and ability to achieve intelligent switching of scenes, the application of the transparent display device in a specific display field attracts more and more attention.

A basic structure of a conventional transparent display device comprises a transparent light guide plate of which a side surface is provided with a light source, a lower polarizer, a transparent display panel having a liquid crystal layer, and an upper polarizer stacked together in order. When the transparent display device displays an image, light emitted from the light source is guided by the light guide plate towards the lower polarizer. The light passes through the lower polarizer and then enters the transparent display panel. After passing through the deflected liquid crystal molecules in the liquid crystal layer, the light exits from the upper polarizer. However, Due to structural limitations of the conventional transparent display device, an angle of the light exiting the transparent display device is limited, and thus a viewing angle of the transparent display device is narrow.

SUMMARY

An object of the present disclosure is to provide a transparent display panel that is capable of enlarging a viewing angle of a transparent display device, and a method for manufacturing the transparent display panel. Further, another object of the present disclosure is to provide a transparent display device comprising the transparent display panel which is capable of enlarging a viewing angle of the display device.

In order to achieve these objects, the present disclosure provides the following technical solutions.

In a first aspect, the present disclosure provides a transparent display panel including: a first substrate, a second substrate, and a third substrate superimposed in order; a first liquid crystal layer and a plurality of first pixels located between the first substrate and the second substrate; and a second liquid crystal layer and a plurality of second pixels located between the second substrate and the third substrate, wherein the plurality of first pixels is distributed in an array, the plurality of second pixels is distributed in an array, and the plurality of second pixels correspond to the plurality of first pixels in a one-to-one manner; the first liquid crystal layer contains first liquid crystal molecules and has a larger refractive index than the first substrate and the second substrate; and the second liquid crystal layer contains second liquid crystal molecules and has a larger refractive index than the third substrate and the second substrate, wherein after applying voltages to one first pixel and one second pixel, a long axial direction of the first liquid crystal molecules corresponding to the one first pixel and a long axial direction of the second liquid crystal molecules corresponding to the one second pixel are not parallel to a surface of the first substrate facing the second substrate at the same time, and the long axial direction of the first liquid crystal molecules in the first liquid crystal layer corresponding to the one first pixel is not parallel to the long axial direction of the second liquid crystal molecules in the second liquid crystal layer corresponding to the one second pixel, and wherein at least part of a side surface of the transparent display panel is a light-entering surface of the transparent display panel, and in the case that light enters the transparent display panel through the light-entering surface and exits from a surface of the first substrate facing away from the second substrate and/or a surface of the third substrate facing away from the second substrate, the transparent display panel displays an image.

In a second aspect, the present disclosure provides a transparent display device including a light source and the transparent display panel as described above, wherein the light source is located on a side surface of the transparent display panel, and opposite to the light-entering surface of the transparent display panel.

In a third aspect, the present disclosure provides a method for manufacturing a transparent display panel which is the transparent display panel as described above, the method including steps of:

providing the first substrate, the second substrate and the third substrate;

superimposing the first substrate, the second substrate and the third substrate in order, forming a plurality of first pixels distributed in an array between the first substrate and the second substrate, and forming a plurality of second pixels distributed in an array between the third substrate and the second substrate, wherein the plurality of first pixels corresponds to the plurality of second pixels in a one-to-one manner; and forming a first liquid crystal layer between the first substrate and the second substrate and forming a second liquid crystal layer between the third substrate and the second substrate.

At least one embodiment according to the present disclosure can product the following advantageous technical effects.

When the transparent display device according to the present disclosure or a transparent display device comprising the transparent display panel of the present disclosure displays an image, since the first liquid crystal layer has a larger refractive index than the first substrate and the second substrate and the second liquid crystal layer has a larger refractive index than the third substrate and the second substrate, light emitted from the light source may be totally internally reflected when travelling within the transparent display panel and gradually travels to each region of the transparent display panel. When voltages are applied to a first pixel and a second pixel corresponding to the first pixel, a long axial direction of the rotated first liquid crystal molecules and a long axial direction of the rotated second liquid crystal molecules are not parallel to the surface of the first substrate facing the second substrate at the same time, and the long axial direction of the rotated first liquid crystal molecules is not parallel to the long axial direction of the rotated second liquid crystal molecules. When the light travels to the first pixel and the corresponding second pixel to which the voltages have been applied, an intensity of light exiting the transparent display panel under the guidance of the rotated first liquid crystal molecules and an intensity of light exiting the transparent display panel under the guidance of the rotated second liquid crystal molecules may compensate for each other. That is, an intensity of light whose exiting direction is at a large angle to the long axial direction of the rotated first liquid crystal molecules is increased, and an intensity of light whose exiting direction is at a large angle to the long axial direction of the rotated second liquid crystal molecules is also increased. Therefore, a viewer whose position is deviated far from a central line of the transparent display device can also see the picture displayed on the transparent display device. In other words, a viewing angle of the transparent display device is enlarged.

BRIEF DESCRIPTION OF THE DRAWINGS

Drawings described here are provided for further understanding of the present disclosure and constitute a part of the present disclosure. Illustrative embodiments of the present disclosure and description thereof are merely for explaining the present disclosure, and not for limiting it thereto. In the drawings.

LIST OF REFERENCE SIGNS

100: transparent display panel; 200: light source; 10: first substrate; 20: second substrate; 30: third substrate; 40: first pixel; 41: first pixel electrode; 42: first common electrode; 43: first liquid crystal layer; 431: first liquid crystal molecules; 432: first stable polymer; 44: first alignment film; 45: second alignment film; 50: second pixel; 51: second pixel electrode; 52: second common electrode; 53: second liquid crystal layer; 531: second liquid crystal molecules; 532: second stable polymer; 54: third alignment film; 55: fourth alignment film.

DETAILED DESCRIPTION

In order to further explain the transparent display panel, its manufacturing method and the transparent display device provided in the embodiments of the present disclosure, the present disclosure will be described in detail in conjunction with the drawings.

Figure 1:
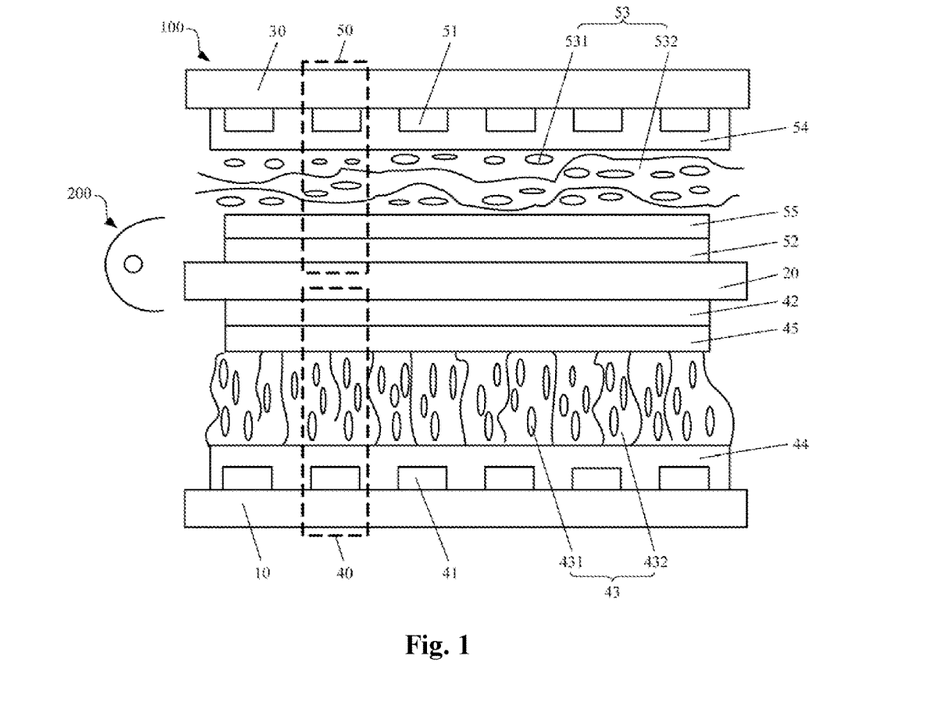
FIG. 1 is a structural schematic view of a transparent display device provided in an embodiment of the present disclosure.

Referring to FIG. 1, a transparent display panel 100 provided in an embodiment of the present disclosure comprises a first substrate 10, a second substrate 20, and a third substrate 30 superimposed in order; a first liquid crystal layer 43 and a plurality of first pixels 40 located between the first substrate 10 and the second substrate 20; and a second liquid crystal layer 53 and a plurality of second pixels 50 located between the second substrate 20 and the third substrate 30. The plurality of first pixels 40 is distributed in an array, the plurality of second pixels 50 is distributed in an array, and the plurality of second pixels 50 corresponds to the plurality of first pixels 40 in a one-to-one manner. The first liquid crystal layer 43 has a larger refractive index than the first substrate 10 and the second substrate 20, and the second liquid crystal layer 53 has a larger refractive index than the third substrate 30 and the second substrate 20. After applying voltages to one first pixel 40 and one second pixel 50, there is an included angle between a long axial direction of the first liquid crystal molecules 431 in the first liquid crystal layer 43 corresponding to the first pixel 40 and a surface of the first substrate 10 facing the second substrate 20, and/or there is an included angle between a long axial direction of the second liquid crystal molecules 531 in the second liquid crystal layer 53 corresponding to the second pixel 50 and a surface of the third substrate 30 facing the second substrate 20, and the long axial direction of the first liquid crystal molecules 431 in the first liquid crystal layer 43 corresponding to the first pixel 40 is not parallel to the long axial direction of the second liquid crystal molecules 531 in the second liquid crystal layer 53 corresponding to the second pixel 50. At least part of a side surface of the transparent display panel 100 is a light-entering surface of the transparent display panel 100 when displaying an image, and in the case that light enters the transparent display panel 100 through the light-entering surface and exits from a surface of the first substrate 10 facing away from the second substrate 20 and/or a surface of the third substrate 30 facing away from the second substrate 20, the transparent display panel 100 displays an image.

Figure 2:
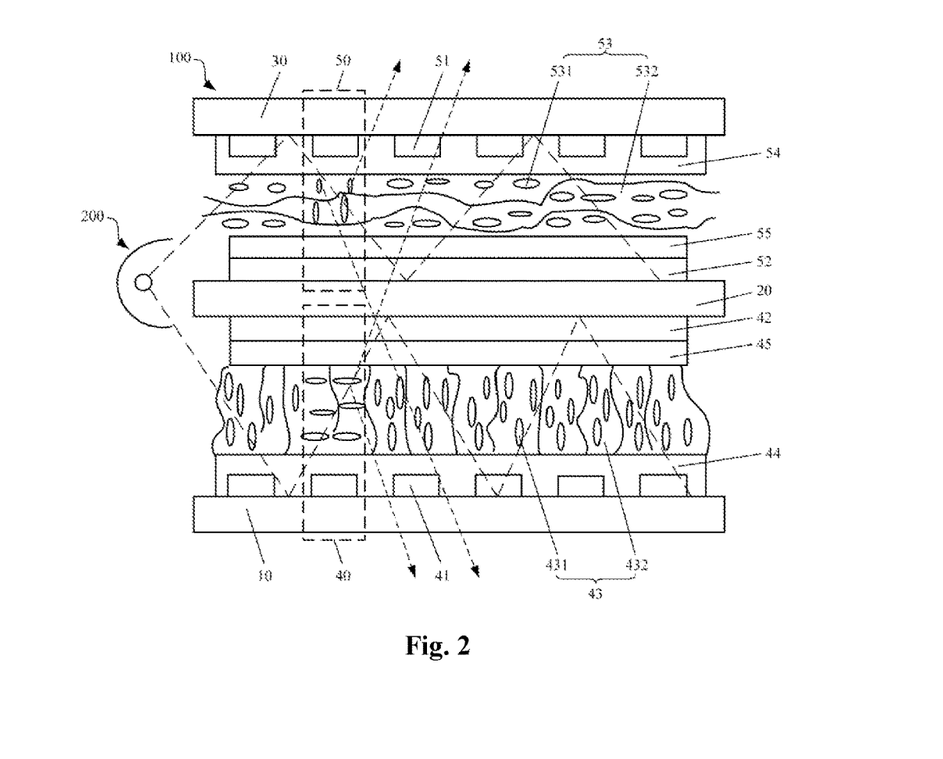
FIG. 2 is a schematic view of a state of a first pixel and a second pixel corresponding to the first pixel of FIG. 1 to which voltages have been applied.

When the transparent display panel 100 provided in the embodiment of the present disclosure is assembled in a transparent display device, a light source is located on a side surface of the transparent display panel 100 and can be exactly opposite to the light-entering surface of the transparent display panel 100 when displaying an image. Referring to FIG. 2, when the light source is lighted up, light emitted from the light source enters the transparent display panel 100 through the light-entering surface. When the light emitted from the light source travels within the transparent display panel 100, first liquid crystal molecules 431 in the first liquid crystal layer 43 corresponding to the first pixel 40 to which no voltage is applied does not rotate and assumes a transparent state, and second liquid crystal molecules 531 in the second liquid crystal layer 53 corresponding to the second pixel 50 to which no voltage is applied does not rotate and assumes a transparent state. When light is incident on the first substrate 10 or the second substrate 20 from the first liquid crystal layer 43 and the incident angle of the light is larger than or equal to a critical angle for total internal reflection, i.e., when the incident angle meets the condition of total internal reflection, since the first liquid crystal layer 43 has a larger refractive index than the first substrate 10 and the second substrate 20, light of which the incident angle meets the condition of total internal reflection travels along a W-shaped path between the first substrate 10 and the second substrate 20, conforms to the principle of traveling in an optical waveguide and can travel to every region between the first substrate 10 and the second substrate 20. For the same reasons, when light is incident on the third substrate 30 or the second substrate 20 from the second liquid crystal layer 53, since the second liquid crystal layer 53 has a larger refractive index than the third substrate 30 and the second substrate 20, light of which the incident angle meets the condition of total internal reflection travels along a W-shaped path between the third substrate 30 and the second substrate 20, conforms to the principle of traveling in an optical waveguide and can travel to every region between the third substrate 30 and the second substrate 20.

When voltages are applied to a first pixel 40 and a second pixel 50 corresponding to the first pixel 40 using a driving circuit, the first liquid crystal molecules 431 in the first liquid crystal layer 43 corresponding to the first pixel 40 to which the voltage has been applied rotate, and the second liquid crystal molecules 531 in the second liquid crystal layer 53 corresponding to the second pixel 50 to which the voltage has been applied rotate. There is an included angle larger than 0 and smaller than 90 degrees between the long axial direction of at least one of the rotated first liquid crystal molecules 431 and the rotated second liquid crystal molecules 531 and an upper surface of the first substrate 10, which can be also interpreted as a case that the long axial direction of the rotated first liquid crystal molecules 431 and the long axial direction of the rotated second liquid crystal molecules 531 are not parallel to the upper surface of the first substrate 10 at the same time. For example, it may be a case that the long axial direction of the rotated first liquid crystal molecules 431 is parallel to the upper surface of the first substrate 10 and there is an included angle between the long axial direction of the rotated second liquid crystal molecules 531 and the upper surface of the first substrate 10; or that the long axial direction of the rotated second liquid crystal molecules 531 is parallel to the upper surface of the first substrate 10 and there is an included angle between the long axial direction of the rotated first liquid crystal molecules 431 and the upper surface of the first substrate 10; or that there is an included angle between the long axial direction of the rotated first liquid crystal molecules 431 and the upper surface of the first substrate 10 and there is an included angle between the long axial direction of the rotated second liquid crystal molecules 531 and the upper surface of the first substrate 10, and the long axial direction of the rotated first liquid crystal molecules 431 is not parallel to the long axial direction of the rotated second liquid crystal molecules 531.

When light traveling within the transparent display panel 100 travels to the rotated first liquid crystal molecules 431, the light is guided by the first liquid crystal molecules 431 and travels along the long axial direction of the first liquid crystal molecules 431, or is refracted on the surface of the first liquid crystal molecules 431, thereby destroying the condition of total internal reflection of light when traveling within the transparent display panel 100 and causing the light to exit from a lower surface of the first substrate 10, or to exit from an upper surface of the third substrate 30. For the same reasons, when light traveling within the transparent display panel 100 travels to the rotated second liquid crystal molecules 531, the light is guided by the second liquid crystal molecules 531 and travels along the long axial direction of the second liquid crystal molecules 531, or is refracted on the surface of the second liquid crystal molecules 531, thereby destroying the condition of total internal reflection of light when traveling within the transparent display panel 100 and causing the light to exit from the lower surface of the first substrate 10, or to exit from the upper surface of the third substrate 30. In this case, the transparent display panel 100 or the transparent display device displays an image.

When light travels to the rotated second liquid crystal molecules 531, light exiting the transparent display panel 100 along the long axial direction of the rotated second liquid crystal molecules 531 has a high intensity, and the larger the angle between the exiting direction and the long axial direction of the rotated second liquid crystal molecules 531 is, the lower the intensity of the light exiting the transparent display panel 100 is. Therefore, a viewer deviated far from the central line of the transparent display device cannot see the picture. Likewise, when light travels to the rotated first liquid crystal molecules 431, the larger the angle between the exiting direction and the long axial direction of the rotated first liquid crystal molecules 431 is, the lower the intensity of the light exiting the transparent display panel 100 is. However, since there is an included angle between the long axial direction of at least one of the rotated first liquid crystal molecules 431 and the rotated second liquid crystal molecules 531 and the upper surface of the first substrate 10, and the long axial direction of the rotated first liquid crystal molecules 431 is not parallel to the long axial direction of the rotated second liquid crystal molecules 531, the intensity of light exiting the transparent display panel 100 under the guidance of the rotated first liquid crystal molecules 431 and the intensity of light exiting the transparent display panel 100 under the guidance of the second liquid crystal molecules 531 may compensate for each other such that the intensity of light whose exiting direction is at a large angle to the long axial direction of the rotated first liquid crystal molecules 431 is increased, and the intensity of light whose exiting direction is at a large angle to the long axial direction of the rotated second liquid crystal molecules 531 is also increased. Therefore, a viewer whose position is deviated far from a central line of the transparent display device can also see the picture displayed on the transparent display device.

As shown in FIG. 2, the present disclosure will be explained by taking the case that the long axial direction of the rotated first liquid crystal molecules 431 is parallel to the upper surface of the first substrate 10 and the long axial direction of the rotated second liquid crystal molecules 531 is perpendicular to the upper surface of the first substrate 10 as an example. From light exiting the transparent display panel 100 under the guidance of the rotated first liquid crystal molecules 431, the light exiting along the long axial direction of the rotated first liquid crystal molecules 431 has a relatively high intensity. The larger the included angle between the exiting direction and the long axial direction of the rotated first liquid crystal molecules 431 is, the lower the intensity of the light is. For example, an intensity of light whose exiting direction is at an included angle of 60 degrees to the long axial direction of the rotated first liquid crystal molecules 431 is lower than an intensity of light whose exiting direction is at an included angle of 30 degrees to the long axial direction of the rotated first liquid crystal molecules 431. For the same reasons, from light exiting the transparent display panel 100 under the guidance of the rotated second liquid crystal molecules 531, the light exiting along the long axial direction of the rotated second liquid crystal molecules 531 has a relatively high intensity. The larger the included angle between the exiting direction and the long axial direction of the rotated second liquid crystal molecules 531 is, the lower the intensity of the light is. For example, an intensity of light whose exiting direction is at an included angle of 60 degrees to the long axial direction of the rotated second liquid crystal molecules 531 is lower than an intensity of light whose exiting direction is at an included angle of 30 degrees to the long axial direction of the rotated second liquid crystal molecules 531. Since the long axial direction of the rotated first liquid crystal molecules 431 is parallel to the upper surface of the first substrate 10 and the long axial direction of the rotated second liquid crystal molecules 531 is perpendicular to the upper surface of the first substrate 10, the light whose exiting direction is at an included angle of 60 degrees to the long axial direction of the rotated first liquid crystal molecules 431 is parallel to the light whose exiting direction is at an included angle of 30 degrees with the long axial direction of the rotated second liquid crystal molecules 531, and the light whose exiting direction is at an included angle of 30 degrees to the long axial direction of the rotated first liquid crystal molecules 431 is parallel to the light whose exiting direction is at an included angle of 60 degrees to the long axial direction of the rotated second liquid crystal molecules 531. As a result, the light whose exiting direction is at an included angle of 30 degrees to the long axial direction of the rotated first liquid crystal molecules 431 can compensate for the intensity of the light whose exiting direction is at an included angle of 60 degrees to the long axial direction of the rotated second liquid crystal molecules 531. Thus, a viewer whose position is deviated far from a central line of the transparent display device can also see the picture displayed on the transparent display device.

When a transparent display device includes the transparent display panel 100 provided in the embodiment of the present disclosure displays an image, light emitted from the light source enters the transparent display panel 100 through the light-entering surface of the transparent display panel 100. Since the first liquid crystal layer 43 has a larger refractive index than the first substrate 10 and the second substrate 20 and the second liquid crystal layer 53 has a larger refractive index than the third substrate 30 and the second substrate 20, light emitted from the light source may be totally internally reflected while traveling within the transparent display panel 100 and gradually travels to each region of the transparent display panel 100. When the light travels to a first pixel 40 and a second pixel 50, to which voltages are applied, both the first liquid crystal molecules 431 in the first liquid crystal layer 43 corresponding to the first pixel 40 and the second liquid crystal molecules 531 in the second liquid crystal layer 53 corresponding to the second pixel 50 rotate. The long axial direction of the rotated first liquid crystal molecules 431 and the long axial direction of the second liquid crystal molecules 531 are not parallel to the surface of the first substrate 10 facing the second substrate 20 at the same time, and the long axial direction of the rotated first liquid crystal molecules 431 is not parallel to the long axial direction of the rotated second liquid crystal molecules 531. As a result, an intensity of light exiting the transparent display panel 100 under the guidance of the rotated first liquid crystal molecules 431 and the intensity of light exiting the transparent display panel 100 under the guidance of the rotated second liquid crystal molecules 531 may compensate for each other such that an intensity of light whose exiting direction is at a large angle to the long axial direction of the rotated first liquid crystal molecules 431 is increased and an intensity of light whose exiting direction is at a large angle to the long axial direction of the rotated second liquid crystal molecules 531 is also increased. Therefore, a viewer whose position is deviated far from a central line of the transparent display device can also see the picture displayed on the transparent display device. In other words, a viewing angle of the transparent display device is enlarged.

In addition, at least part of a side surface of the transparent display panel 100 provided in the embodiment of the present disclosure is a light-entering surface of the transparent display panel 100 when displaying an image. Light enters the transparent display panel 100 through the light-entering surface and exits from a surface of the first substrate 10 facing away from the second substrate 20 and/or a surface of the third substrate 30 facing away from the second substrate 20. In this case, the transparent display panel 100 displays an image. As compared with a transparent display device comprising a lower polarizer, a transparent display panel and an upper polarizer, the transparent display device comprising the transparent display panel 100 provided in the embodiment of the present disclosure does not need the lower polarizer and the upper polarizer, thus the transmittance can be improved.

Furthermore, no light guide plate is required to be provided on the back of the transparent display panel 100 provided in the embodiment of the present disclosure. After entering the transparent display panel 100 through the light-entering surface, light exits from a surface of the first substrate 10 facing away from the second substrate 20 and/or a surface of the third substrate 30 facing away from the second substrate 20, thereby displaying an image on the transparent display panel 100. In prior art, the light-entering surface of the transparent display panel 100 when displaying an image is the back of the transparent display panel 100, and a light guide plate is required to be provided on the back of the transparent display panel 100. In contrast, when assembling the transparent display panel 100 according to the present disclosure in a transparent display device, the light source is located on a side surface of the transparent display panel 100, and there is no need to provide a light guide plate on the back of the transparent display panel 100. In this way, the light emitted from the light source can enter the transparent display panel 100 through the light-entering surface. Therefore, it is able to reduce the thickness of the transparent display device, which is conductive to the development of thin and light transparent display devices.

The transparent display panel 100 provided in the embodiment of the present disclosure can be applied to shop windows, glass curtain walls of buildings, windows of cars, doors of cabinets, doors of refrigerators, etc.

In the embodiments as described above, the first pixel 40 can be provided in a plurality of manners. Several manners in which the first pixel is provided will be illustrated below by way of example, but the manner in which the first pixel is provided is not limited thereto.

First Manner in which the First Pixel 40 is Arranged

Still referring to FIG. 1, the first pixel 40 comprises a first common electrode 42 and a first pixel electrode 41. The first common electrode 42 is located on a surface of the second substrate 20 facing the first substrate 10, and the first pixel electrode 41 is located on a surface of the first substrate 10 facing the second substrate 20. When voltages are applied to the first pixel electrode 41 and the first common electrode 42, respectively, the first pixel 40 generates a vertical electric field. The vertical electric field may be interpreted as an electric field of which the direction is perpendicular to the surface of the first substrate 10 facing the second substrate 20.

Second Manner in which the First Pixel 40 is Arranged

The first pixel 40 comprises a first common electrode 42 and a first pixel electrode 41. The first common electrode 42 is located on a surface of the first substrate 10 facing the second substrate 20, and the first pixel electrode 41 is located on a surface of the second substrate 20 facing the first substrate 10. When voltages are applied to the first pixel electrode 41 and the first common electrode 42, respectively, the first pixel 40 generates a vertical electric field. The vertical electric field may be interpreted as an electric field of which the direction is perpendicular to the surface of the first substrate 10 facing the second substrate 20.

Third Manner in which the First Pixel 40 is Arranged

Figure 3:
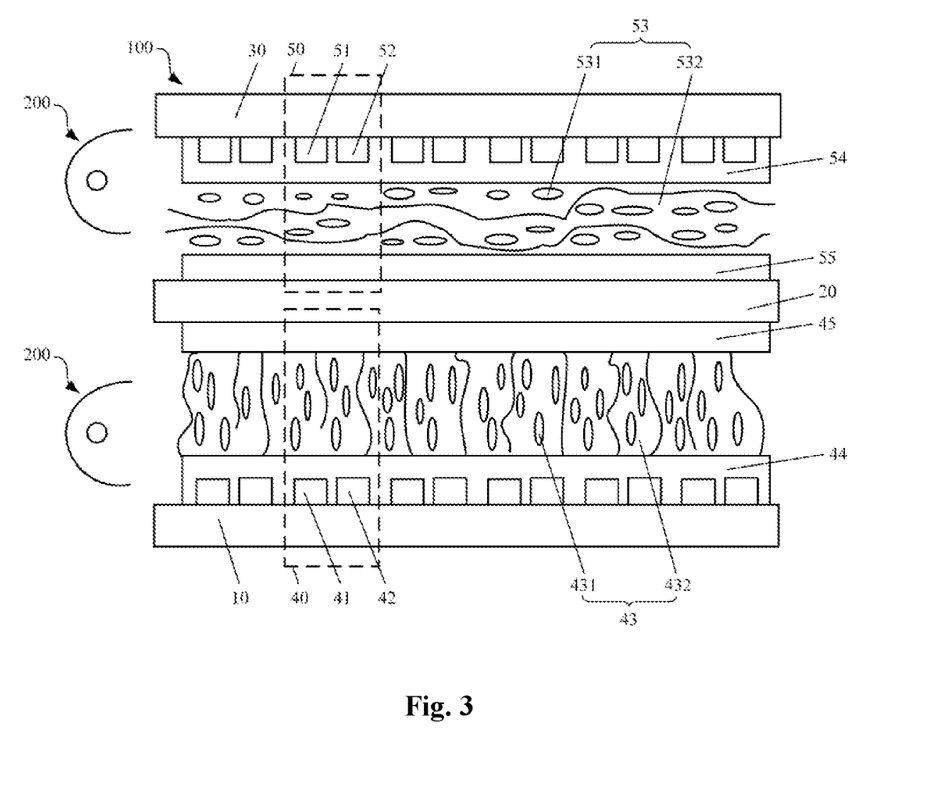
FIG. 3 is a structural schematic view of another transparent display device provided in an embodiment of the present disclosure.

Referring to FIG. 3, the first pixel 40 comprises a first common electrode 42 and a first pixel electrode 41. Both the first common electrode 42 and the first pixel electrode 41 are located on a surface of the first substrate 10 facing the second substrate 20. When voltages are applied to the first pixel electrode 41 and the first common electrode 42, respectively, the first pixel 40 generates a parallel electric field. The parallel electric field may be interpreted as an electric field of which the direction is parallel to the surface of the first substrate 10 facing the second substrate 20.

Fourth Manner in which the First Pixel 40 is Arranged

The first pixel 40 comprises a first common electrode 42 and a first pixel electrode 41. Both the first common electrode 42 and the first pixel electrode 41 are located on a surface of the second substrate 20 facing the first substrate 10. When voltages are applied to the first pixel electrode 41 and the first common electrode 42, respectively, the first pixel 40 generates a parallel electric field. The parallel electric field may be interpreted as an electric field of which the direction is parallel to the surface of the first substrate 10 facing the second substrate 20.

In the embodiments as described above, the second pixel 50 may be provided in a plurality of manners. Several manners in which the second pixel 50 is provided are illustrated below by way of example, but the manner in which the second pixel 50 is provided is not limited thereto.

First Manner in which the Second Pixel 50 is Arranged

Still referring to FIG. 1, the second pixel 50 comprises a second common electrode 52 and a second pixel electrode 51. The second common electrode 52 is located on a surface of the second substrate 20 facing the third substrate 30, and the second pixel electrode 51 is located on a surface of the third substrate 30 facing the second substrate 20. When voltages are applied to the second pixel electrode 51 and the second common electrode 52, respectively, the second pixel 50 generates a vertical electric field. The vertical electric field may be interpreted as an electric field of which the direction is perpendicular to the surface of the first substrate 10 facing the second substrate 20.

Second Manner in which the Second Pixel 50 is Arranged

The second pixel 50 comprises a second common electrode 52 and a second pixel electrode 51. The second common electrode 52 is located on a surface of the third substrate 30 facing the second substrate 20, and the second pixel electrode 51 is located on a surface of the second substrate 20 facing the third substrate 30. When voltages are applied to the second pixel electrode 51 and the second common electrode 52, respectively, the second pixel 50 generates a vertical electric field. The vertical electric field may be interpreted as an electric field of which the direction is perpendicular to the surface of the first substrate 10 facing the second substrate 20.

Third Manner in which the Second Pixel 50 is Arranged

Still referring to FIG. 3, the second pixel 50 comprises a second common electrode 52 and a second pixel electrode 51. Both the second common electrode 52 and the second pixel electrode 51 are located on a surface of the third substrate 30 facing the second substrate 20. When n voltages are applied to the second pixel electrode 51 and the second common electrode 52, respectively, the second pixel 50 generates a parallel electric field. The parallel electric field may be interpreted as an electric field of which the direction is parallel to the surface of the first substrate 10 facing the second substrate 20.

Fourth Manner in which the Second Pixel 50 is Arranged

The second pixel 50 comprises a second common electrode 52 and a second pixel electrode 51. Both the second common electrode 52 and the second pixel electrode 51 are located on a surface of the second substrate 20 facing the third substrate 30. When voltages are applied to the second pixel electrode 51 and the second common electrode 52, respectively, the second pixel 50 generates a parallel electric field. The parallel electric field may be interpreted as an electric field of which the direction is parallel to the surface of the first substrate 10 facing the second substrate 20.

In the embodiments described above, the material of the first liquid crystal molecules 431 may be selected as desired. Two options are illustrated below, but the material is not limited thereto.

Option 1 of the Material of the First Liquid Crystal Molecules 431

The first liquid crystal molecules 431 may be negative liquid crystal molecules. When the first liquid crystal molecules 431 are placed in an electric field, a long axial direction of the deflected first liquid crystal molecules 431 is a direction perpendicular to the direction of the electric field.

Option 2 of the Material of the First Liquid Crystal Molecules 431

The first liquid crystal molecules 431 may be positive liquid crystal molecules. When the first liquid crystal molecules 431 are placed in an electric field, a long axial direction of the deflected first liquid crystal molecules 431 is a direction parallel to the direction of the electric field.

The material of the second liquid crystal molecules 531 may also be selected as desired. Two options will be illustrated below, and the material is not limited thereto.

Option 1 of the Material of the Second Liquid Crystal Molecules 531

The second liquid crystal molecules 531 may be negative liquid crystal molecules. When the second liquid crystal molecules 531 are placed in an electric field, a long axial direction of the deflected second liquid crystal molecules 531 is a direction perpendicular to the direction of the electric field.

Option 2 of the Material of the Second Liquid Crystal Molecules 531

The second liquid crystal molecules 531 may be positive liquid crystal molecules. When the second liquid crystal molecules 531 are placed in an electric field, a long axial direction of the deflected second liquid crystal molecules 531 is a direction parallel to the direction of the electric field.

In the embodiments described above, an original alignment manner of the first liquid crystal molecules 431 and an original alignment manner of the second liquid crystal molecules 531 may be set as desired.

First Original Alignment Manner of the First Liquid Crystal Molecules 431

Still referring to FIG. 1, an original alignment direction of the first liquid crystal molecules 431 is perpendicular to a surface of the first substrate 10 facing the second substrate 20.

Second Original Alignment Manner of the First Liquid Crystal Molecules 431

An original alignment direction of the first liquid crystal molecules 431 is parallel to a surface of the first substrate 10 facing the second substrate 20.

First Original Alignment Manner of the Second Liquid Crystal Molecules 531

An original alignment manner of the second liquid crystal molecules 531 is perpendicular to a surface of the third substrate 30 facing the second substrate 20.

Second Original Alignment Manner of the Second Liquid Crystal molecules 531

An original alignment manner of the second liquid crystal molecules 531 is parallel to a surface of the third substrate 30 facing the second substrate 20.

In the embodiments described above, after applying voltages to a first pixel 40 and a second pixel 50, there is an included angle between the long axial direction of the first liquid crystal molecules 431 in the first liquid crystal layer 43 corresponding to the first pixel 40 and the surface of the first substrate 10 facing the second substrate 20, and/or, there is an included angle between the long axial direction of the second liquid crystal molecules 531 in the second liquid crystal layer 53 corresponding to the second pixel 50 and the surface of the third substrate 30 facing the second substrate 20, and the long axial direction of the first liquid crystal molecules 431 in the first liquid crystal layer 43 corresponding to the first pixel 40 is not parallel to the long axial direction of the second liquid crystal molecules 531 in the second liquid crystal layer 53 corresponding to the second pixel 50. In the case where these conditions are satisfied, the arrangement manner of the first pixel 40, the option of the material of the first liquid crystal molecules 431, the original alignment manner of the first liquid crystal molecules 431, the arrangement manner of the second pixel, the option of the material of the second liquid molecule 531 and the original alignment manner of the second liquid crystal molecules 531 can be combined in various manners.

For example, still referring to claim 1, the transparent display panel 100 may be arranged as follows: the first arrangement manner of the first pixel 40, the option 1 of the material of the first liquid crystal molecules 431, the first original alignment manner of the first liquid crystal molecules 431, the first arrangement manner of the second pixel 50, the option 2 of the material of the second liquid crystal molecules 531 and the second original alignment manner of the second liquid crystal molecules 531. Specifically, as shown in FIG. 1, in the first pixel 40, the first pixel electrode 41 is located on an upper surface of the first substrate 10, the first common electrode 42 is located on a lower surface of the second substrate 20, and in the first liquid crystal layer 43, an original alignment direction of the first liquid crystal molecules 431 is perpendicular to the upper surface of the first substrate 10, long chains of first stable polymers 432 are aligned in a direction perpendicular to the upper surface of the first substrate 10, and the first liquid crystal molecules 431 are negative liquid crystal molecules; in the second pixel 50, the second pixel electrode 50 is located on a lower surface of the third substrate 30, the second common electrode 52 is located on the upper surface of the second substrate 20, and in the second liquid crystal layer 53, an original alignment direction of the second liquid crystal molecules 531 is parallel to the upper surface of the first substrate 10, and long chains of second stable polymers 532 are aligned in a direction parallel to the upper surface of the first substrate 10, and the second liquid crystal molecules 531 are positive liquid crystal molecules.

After applying a voltage to the first pixel 40 of the transparent display panel arranged as above, i.e., applying voltage to the first pixel electrode 41 and the first common electrode 42, respectively, the first pixel 40 generates a vertical electric field. The first liquid crystal molecules 431 rotate under action of the vertical electric field, and a long axial direction of the rotated first liquid crystal molecules 431 is a direction parallel to the upper surface of the first substrate 10; after applying a voltage to the second pixel 50, i.e., applying voltages to the second pixel electrode 51 and the second common electrode 52, respectively, the second pixel 50 generates a vertical electric field, and the second liquid crystal molecules 531 rotate under action of the vertical electric field, and a long axial direction of the rotated second liquid crystal molecules 531 is a direction perpendicular to the upper surface of the first substrate 10.

In the transparent display panel 100 provided in the above embodiment, there are a plurality of first pixels 40 and a plurality of second pixels 50. The plurality of first pixels 40 shares a first common electrode 42 which is provided on the lower surface of the second substrate 20. Each of the first pixels 40 comprises a first pixel electrode 41 which is provided on the upper surface of the first substrate 10. The first pixel electrode 41 comprises a thin film transistor for driving the first pixel electrode 41, and a projection of the first common electrode 42 on the upper surface of the first substrate 10 covers projections of the plurality of first pixels 40 on the upper surface of the first substrate 10. The plurality of second pixels 50 shares one second common electrode 52 which is provided on the upper surface of the second substrate 20. Each of the second pixels 50 comprises one second pixel electrode 51 which is proved on a lower surface of the third substrate 30. The second pixel electrode 51 comprises a thin film transistor for driving the second pixel substrate 51. As compared with the case in which the first pixel electrode 41 is provided on the lower surface of the second substrate 20, the first common electrode 42 is arranged on the upper surface of the first substrate 10, the second pixel electrode 51 is provided on the upper surface of the second substrate 20, and the second common electrode 52 is provided on the lower surface of the third substrate 30, the above design can prevent the plurality of independent first pixel electrodes 41 and the thin film transistor of each first pixel electrode 41 from adversely affecting light traveling to the second substrate 20, and prevent the plurality of independent second pixel electrodes 51 and the thin film transistor of each second pixel electrode 51 from adversely affecting light traveling to the second substrate 20.

In a practical application, the transparent display panel 100 may be arranged as follows: the second arrangement manner of the first pixel 40, the option 1 of the material of the first liquid crystal molecules 431, the first original alignment manner of the first liquid crystal molecules 431, the second arrangement manner of the second pixel 50, the option 2 of the material of the second liquid crystal molecules 531 and the second original alignment manner of the second liquid crystal molecules 531. For the transparent display panel thus arranged, in the first pixel 40, the first common electrode 42 is located on an upper surface of the first substrate 10, the first pixel electrode 41 is located on a lower surface of the second substrate 20; in the second pixel 50, the second common electrode 52 is located on a lower surface of the third substrate 30, and the second pixel electrode 51 is located on the upper surface of the second substrate 20. The first common electrode 42 and the second common electrode 52 can shield an electrical signal from the outside of the transparent display panel, and prevent the electrical signal from the outside of the transparent display panel from adversely affecting picture displaying quality of the transparent display device.

Still referring to FIG. 1, in the embodiment of the present disclosure, the first liquid crystal layer 43 further contains first stable polymers 432, and the second liquid crystal layer 531 further contains second stable polymers 532. The first stable polymers 432 are uniformly mixed with the first liquid crystal molecules 431, and long chains of the first stable polymers 432 are aligned in an original alignment direction of the first liquid crystal molecules 431. The second stable polymers 532 are uniformly mixed with the second liquid crystal molecules 531, and long chains of the second stable polymers 532 are aligned in an original alignment direction of the second liquid crystal molecules 531.

The first stable polymers 432 are provided in first liquid crystal layer 43, and long chains of the first stable polymers 432 are aligned in the original alignment direction of the first liquid crystal molecules 431. The original alignment direction of the first liquid crystal molecules 431 may be regarded as the long axial direction of the first liquid crystal molecules 431 that are not rotated. For example, as shown in FIG. 1, the original alignment direction of the first liquid crystal molecules 431 is perpendicular to the surface of the first substrate 10 facing the second substrate 20, thus the long chains of the first stable polymers 432 are aligned in a direction perpendicular to the surface of the first substrate 10 facing the second substrate 20. According to the alignment direction of the long chains of the first stable polymers 432, the original alignment direction and rotation of the first liquid crystal molecules 431 can be guided such that the long axial direction of the first liquid crystal molecules 431 has a relatively stable and accurate alignment.

The second stable polymers 532 are provided in the second liquid crystal layer 53, and long chains of the second stable polymers 532 are aligned in the original alignment direction of the second liquid crystal molecules 531. The original alignment direction of the second liquid crystal molecules 531 may be regarded as the long axial direction of the second liquid crystal molecules 531 that are not rotated. For example, as shown in FIG. 1, the original alignment direction of the second liquid crystal molecules 531 is parallel to the surface of the first substrate 10 facing the second substrate 20, thus the long chains of the second stable polymers 532 are aligned in a direction parallel to the surface of the first substrate 10 facing the second substrate 20. According to the alignment direction of the long chains of the second stable polymers 532, the original alignment direction and rotation of the second liquid crystal molecules 531 can be guided such that the long axial direction of the second liquid crystal molecules 531 has a relatively stable and accurate alignment.

Still referring to FIGS. 1 and 3, the transparent display panel 100 provided in the embodiment of the present disclosure further comprises a first alignment film 44 superimposed on the surface of the first substrate 10 facing the second substrate 20, a second alignment film 45 superimposed on the surface of the second substrate 20 facing the first substrate 10, a third alignment film 54 superimposed on the surface of the third substrate 30 facing the second substrate 20, and a fourth alignment film 55 superimposed on the surface of the second substrate 20 facing the third substrate 30. The first liquid crystal layer 43 is located between the first alignment film 44 and the second alignment film 45, and an alignment direction of the first alignment film 44 and an alignment direction of the alignment film 45 are identical to the original alignment direction of the first liquid crystal molecules 431. The second liquid crystal layer 53 is located between the third alignment film 54 and the fourth alignment film 55, and an alignment direction of the third alignment film 54 and an alignment direction of the fourth alignment film 55 are identical to the original alignment direction of the second liquid crystal molecules 531.

The first alignment film 44 and the second alignment film 45 are arranged such that a preset angle can be provided for the first liquid crystal molecules 431 to cause the first liquid crystal molecules 431 to be aligned in a specific original alignment direction. For example, when it is required that the original alignment direction of the first liquid crystal molecules 431 is perpendicular to the upper surface of the first substrate 10, both alignment directions of the first alignment film 44 and the second alignment film 45 are perpendicular to the upper surface of the first substrate 10. After the first liquid crystal molecules 431 are filled between the first alignment film 44 and the second alignment film 45, the first liquid crystal molecules 431 may be aligned in a direction perpendicular to the upper surface of the first substrate 10, that is, the original alignment direction of the first liquid crystal molecules 431 is perpendicular to the upper surface of the first substrate 10.

The third alignment film 54 and the fourth alignment film 55 are arranged such that a preset angle can be provided for the second liquid crystal molecules 531 to cause the second liquid crystal molecules 531 to be aligned in a specific original alignment direction. For example, when it is required that the original alignment direction of the second liquid crystal molecules 531 is parallel to the upper surface of the first substrate 10, both alignment directions of the third alignment film 54 and the fourth alignment film 55 are parallel to the upper surface of the first substrate 10. After the second liquid crystal molecules 531 are filled between the third alignment film 54 and the fourth alignment film 55, the second liquid crystal molecules 531 may be aligned in a direction parallel to the upper surface of the first substrate 10, that is, the original alignment direction of the second liquid crystal molecules 531 is parallel to the upper surface of the first substrate 10.

The present disclosure further provides in an embodiment a transparent display device that comprises a light source 200 and the transparent display panel 100 as described in the above embodiment. The light source 200 is located on a side surface of the transparent display panel 100 and opposite to the light-entering surface of the transparent display panel 100.

As shown in FIG. 1, the light source 200 may be exactly opposite to a side surface of the second substrate 20 in the transparent display panel 100. Alternatively, as shown in FIG. 3, there may be a plurality of light sources 200, one of which is exactly opposite to a side surface of the first liquid crystal layer 43 in the transparent display panel 100, and another one of which is exactly opposite to a side surface of the second liquid crystal layer 53 in the transparent display panel 100.

The transparent display device has the same advantages as the transparent display panel described above as compared with the prior art, and these advantages will not be repeated here.

The present disclosure further provides in an embodiment a method for manufacturing a transparent display panel that is the transparent display panel as described above, which method comprises:

Step 100: providing a first substrate, a second substrate and a third substrate;

Step 300: superimposing the first substrate, the second substrate and the third substrate in order, forming a plurality of first pixels distributed in an array between the first substrate and the second substrate, and forming a plurality of second pixels distributed in an array between the third substrate and the second substrate, wherein the plurality of first pixels corresponds to the plurality of first pixels in a one-to-one manner; and Step 400: forming a first liquid crystal layer between the first substrate and the second substrate and forming a second liquid crystal layer between the third substrate and the second substrate.

Figure 4:
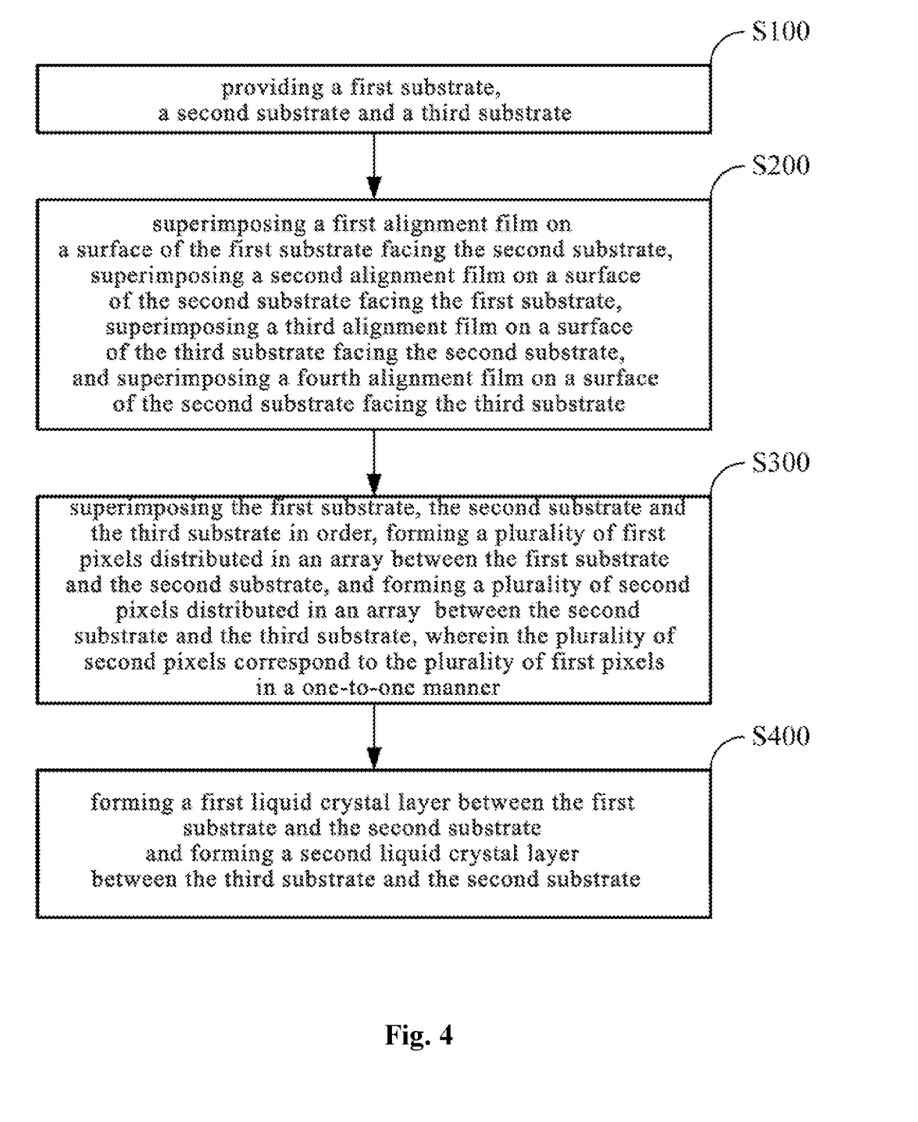
FIG. 4 is a flow chart of a method for manufacturing a transparent display panel provided in embodiment 1 of the present disclosure.

Optionally, the method further comprises step 200: superimposing a first alignment film on a surface of the first substrate facing the second substrate, superimposing a second alignment film on a surface of the second substrate facing the first substrate, superimposing a third alignment film on a surface of the third substrate facing the second substrate, and superimposing a fourth alignment film on a surface of the second substrate facing the third substrate. Please refer to FIG. 4 for details.

The embodiments in this specification are described in a progressive mode and can be referred to each other for the same or similar part, and each embodiment is described by focusing on its difference from the other embodiments. For a method embodiment, since it is generally similar to a product embodiment, its description is simple and you may refer to the product embodiment for relevant parts.

Figure 5:
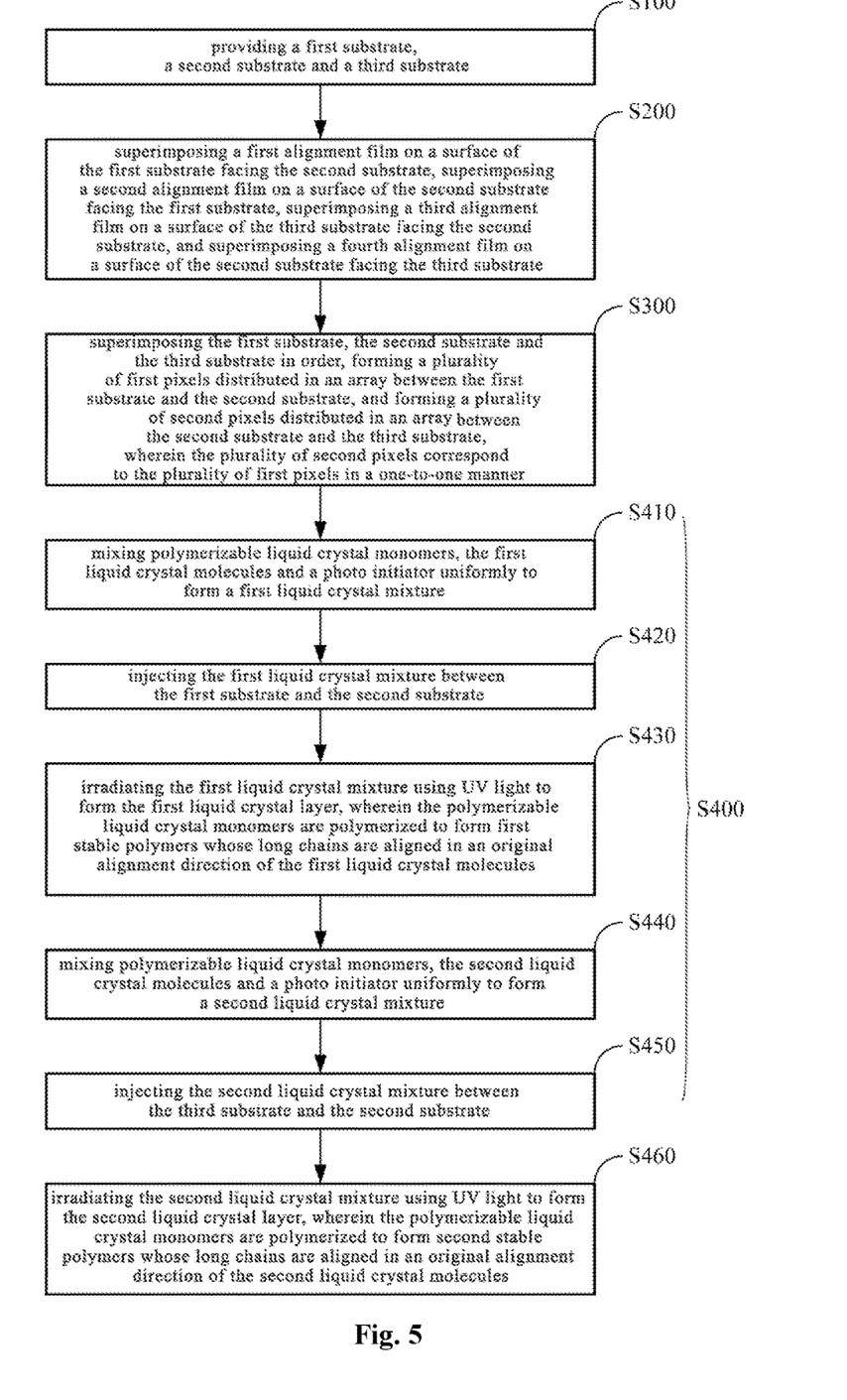
FIG. 5 is a flow chart of a method for manufacturing a transparent display panel provided in embodiment 2 of the present disclosure.

Referring to FIG. 5, step S400 of forming the first liquid crystal layer between the first substrate and the second substrate and forming the second liquid crystal layer between the third substrate and the second substrate may comprise:

step S410: mixing polymerizable liquid crystal monomers, the first liquid crystal molecules and a photo initiator uniformly to form a first liquid crystal mixture;

step S420: injecting the first liquid crystal mixture between the first substrate and the second substrate;

step S430: irradiating the first liquid crystal mixture using UV light to form the first liquid crystal layer, wherein the polymerizable liquid crystal monomers are polymerized to form first stable polymers whose long chains are aligned in an original alignment direction of the first liquid crystal molecules;

step S440: mixing polymerizable liquid crystal monomers, the second liquid crystal molecules and a photo initiator uniformly to form a second liquid crystal mixture;

step S450: injecting the second liquid crystal mixture between the third substrate and the second substrate;

step S460: irradiating the second liquid crystal mixture using UV light to form the second liquid crystal layer, wherein the polymerizable liquid crystal monomers are polymerized to form second stable polymers whose long chains are aligned in an original alignment direction of the second liquid crystal molecules.

In the embodiment described above, the order of forming the first liquid crystal layer and the second liquid crystal layer is not limited. When step S400 is carried out, the formation of the first liquid crystal layer may be followed by the formation of the second liquid crystal layer. In other words, steps S410, S420 and S430 are first carried out in order, and then steps S440, S450 and S460 are carried out in order. Alternatively, the formation of the second liquid crystal layer is followed by the formation of the first liquid crystal layer. In order words, steps S440, S450 and S460 are first carried out in order, and then steps S410, S420 and S430 are carried out in order.

Figure 6:
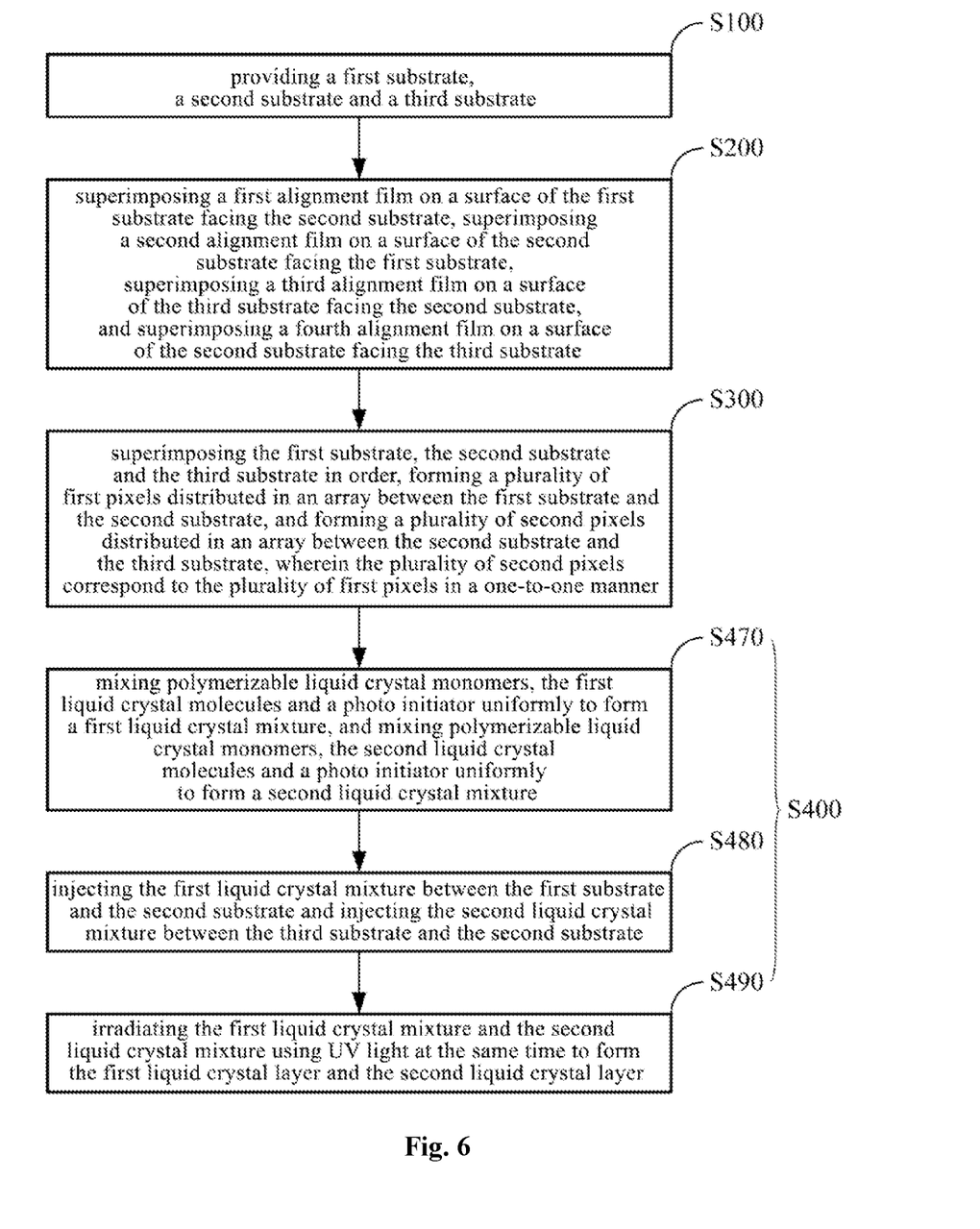
FIG. 6 is a flow chart of a method for manufacturing a transparent display panel provided in embodiment 3 of the present disclosure.

Referring to FIG. 6, the step S400 of forming the first liquid crystal layer between the first substrate and the second substrate and forming the second liquid crystal layer between the third substrate and the second substrate may further comprise:

step S470: mixing polymerizable liquid crystal monomers, the first liquid crystal molecules and a photo initiator uniformly to form a first liquid crystal mixture, and mixing polymerizable liquid crystal monomers, the second liquid crystal molecules and a photo initiator uniformly to form a second liquid crystal mixture;

step S480: injecting the first liquid crystal mixture between the first substrate and the second substrate and injecting the second liquid crystal mixture between the third substrate and the second substrate;

step S490: irradiating the first liquid crystal mixture and the second liquid crystal mixture using UV light at the same time to form the first liquid crystal layer and the second liquid crystal layer, wherein the polymerizable liquid crystal monomers in the first liquid crystal mixture are polymerized to form first stable polymers whose long chains are aligned in an original alignment direction of the first liquid crystal molecules, and the polymerizable liquid crystal monomers in the second liquid crystal mixture are polymerized to form second stable polymers whose long chains are aligned in an original alignment direction of the second liquid crystal molecules.

By irradiating UV light once, the first liquid crystal layer and the second liquid crystal layer are formed at the same time. Thus, it is able to reduce the steps of the process for manufacturing the transparent display panel and reduce time and cost.

In the embodiment described above, in the first liquid crystal mixture, the polymerizable liquid crystal monomers account for 1% to 5% by mass of the first liquid crystal mixture, and the photo initiator accounts for 0.5% to 3% by mass of the first liquid crystal mixture; and in the second liquid crystal mixture, the polymerizable liquid crystal monomers account for 1% to 5% by mass of the second liquid crystal mixture, and the photo initiator accounts for 0.5% to 3% by mass of the second liquid crystal mixture.

The transparent display panel in the above embodiment further comprises: a first alignment film superimposed on a surface of the first substrate facing the second substrate, a second alignment film superimposed on a surface of the second substrate facing the first substrate, a third alignment film superimposed on a surface of the third substrate facing the second substrate, and a fourth alignment film superimposed on a surface of the second substrate facing the third substrate.

In order to explain the method for manufacturing the transparent display panel provided in the embodiment of the present disclosure in detail, the method will be described by taking the structure of the transparent display panel provided in FIG. 1 as an example. The method for manufacturing the transparent display panel provided in FIG. 1 comprises the following steps S100 to S400:

step S100: providing a first substrate, a second substrate and a third substrate; forming a plurality of first pixel electrodes on a surface of the first substrate; forming a first common electrode on a surface of the second substrate;

forming a second common electrode on another surface of the second substrate, the second common electrode being opposite to the first common electrode; and forming a plurality of second pixel electrodes on a surface of the third substrate;

step S200: superimposing a first alignment film on a surface of the first substrate facing the second substrate, superimposing a second alignment film on a surface of the second substrate facing the first substrate, superimposing a third alignment film on a surface of the third substrate facing the second substrate, and superimposing a fourth alignment film on a surface of the second substrate facing the third substrate; or, forming a first alignment film on a surface of the first substrate and the plurality of pixel electrodes, forming a second alignment film on the first common electrode, forming a fourth alignment film on the second common electrode and forming a third alignment film on a surface of the third substrate and the plurality of second pixel electrodes.

step S300: superimposing the first substrate, the second substrate and the third substrate in order, wherein the first substrate and the second substrate may be placed opposite to each other to form a cell using a frame sealant, the surface of the first substrate provided with the first alignment film and the plurality of first pixel electrodes is opposite to the surface of the second substrate provided with the first common electrode and the second alignment film, each first pixel electrode and the first common electrode may constitute one first pixel, and there is an injection hole for the frame sealant between the first substrate and the second substrate; and the second substrate and the third substrate are placed opposite to each other to form a cell using the frame sealant, the surface of the third substrate provided with the third alignment film and the plurality of second pixel electrodes is opposite to the surface of the second substrate provided with the second common electrode and the fourth alignment film, each second pixel electrode and the second common electrode may constitute one second pixel, and there is an injection hole for the frame sealant between the second substrate and the third substrate.

step S400: forming a first liquid crystal layer between the first substrate and the second substrate and forming a second liquid crystal layer between the third substrate and the second substrate, wherein the first liquid crystal mixture may be injected through the injection hole for the frame sealant between the first substrate and the second substrate when it is injected between the first substrate and the second substrate; and the second liquid crystal mixture may be injected through the injection hole for the frame sealant between the second substrate and the third substrate when it is injected between the third substrate and the second substrate.

In the description of the above embodiments, specific features, structures, materials or characteristics may be appropriately combined in any one or multiple embodiments or examples.

The above are merely the specific embodiments of the present disclosure, but the protection scope of the present disclosure is not limited thereto. Variations or alternatives that can be readily envisaged by a person skilled in the art according to technical contents revealed in the present disclosure should fall within the protection scope of the present disclosure. The protection scope of the present disclosure should be defined by the terms of the appending claims.

What is claimed is:

1. A transparent display panel, comprising: a first substrate, a second substrate, and a third substrate superimposed in order; a first liquid crystal layer and a plurality of first pixels located between the first substrate and the second substrate; and a second liquid crystal layer and a plurality of second pixels located between the second substrate and the third substrate,
    wherein the plurality of first pixels is distributed in an array, the plurality of second pixels is distributed in an array, and the plurality of second pixels corresponds to the plurality of first pixels in a one-to-one manner; the first liquid crystal layer contains first liquid crystal molecules and has a larger refractive index than the first substrate and the second substrate; and the second liquid crystal layer contains second liquid crystal molecules and has a larger refractive index than the third substrate and the second substrate,
    wherein the transparent display panel is configured so that, after voltages are applied to one first pixel and one second pixel, a long axial direction of the first liquid crystal molecules corresponding to the one first pixel and a long axial direction of the second liquid crystal molecules corresponding to the one second pixel are not parallel to a surface of the first substrate facing the second substrate at the same time, and the long axial direction of the first liquid crystal molecules in the first liquid crystal layer corresponding to the one first pixel is not parallel to the long axial direction of the second liquid crystal molecules in the second liquid crystal layer corresponding to the one second pixel, and
    wherein at least part of a side surface of the transparent display panel is a light-entering surface of the transparent display panel, and in the case that light enters the transparent display panel through the light-entering surface and exits from a surface of the first substrate facing away from the second substrate and a surface of the third substrate facing away from the second substrate, the transparent display panel is configured to display an image,
    wherein each first pixel comprises a first common electrode and a first pixel electrode, and the first pixel electrode is located on a surface of the first substrate facing the second substrate and wherein each second pixel comprises a second common electrode and a second pixel electrode, and the second pixel electrode is located on a surface of the third substrate facing the second substrate.

2. The transparent display panel according to claim 1, wherein the first common electrode is located on a surface of the second substrate facing the first substrate, or on the surface of the first substrate facing the second substrate.

3. The transparent display panel according to claim 1, wherein the second common electrode is located on a surface of the second substrate facing the third substrate, or on a surface of the third substrate facing the second substrate.

4. The transparent display panel according to claim 1, wherein the first liquid crystal molecules are negative liquid crystal molecules or positive liquid crystal molecules, and an original alignment direction of the first liquid crystal molecules is perpendicular or parallel to the surface of the first substrate facing the second substrate; wherein the second liquid crystal molecules are negative liquid crystal molecules or positive liquid crystal molecules, and an original alignment direction of the second liquid crystal molecules is perpendicular or parallel to a surface of the third substrate facing the second substrate.

5. The transparent display panel according to claim 1, wherein the first liquid crystal layer further contains first stable polymers which are uniformly mixed with the first liquid crystal molecules and whose long chains are aligned in an original alignment direction of the first liquid crystal molecules; wherein the second liquid crystal layer further contains second stable polymers which are uniformly mixed with the second liquid crystal molecules and whose long chains are aligned in an original alignment direction of the second liquid crystal molecules.

6. The transparent display panel according to claim 1, wherein the transparent display panel further comprises: a first alignment film superimposed on the surface of the first substrate facing the second substrate, a second alignment film superimposed on a surface of the second substrate facing the first substrate, a third alignment film superimposed on a surface of the third substrate facing the second substrate, and a fourth alignment film superimposed on a surface of the second substrate facing the third substrate; wherein an alignment direction of the first alignment film and an alignment direction of the second alignment film are identical to an original alignment direction of the first liquid crystal molecules, and an alignment direction of the third alignment film and an alignment direction of the fourth alignment film are identical to an original alignment direction of the second liquid crystal molecules.

7. A transparent display device comprising a light source and the transparent display panel according to claim 1, wherein the light source is located on a side surface of the transparent display panel, and opposite to a light-entering surface of the transparent display panel.

8. The transparent display device according to claim 7, wherein the first common electrode is located on a surface of the second substrate facing the first substrate, or on the surface of the first substrate facing the second substrate.

9. The transparent display device according to claim 7, wherein the second common electrode is located on a surface of the second substrate facing the third substrate, or on a surface of the third substrate facing the second substrate.

10. The transparent display device according to claim 7, wherein the first liquid crystal molecules are negative liquid crystal molecules or positive liquid crystal molecules, and an original alignment direction of the first liquid crystal molecules is perpendicular or parallel to the surface of the first substrate facing the second substrate; wherein the second liquid crystal molecules are negative liquid crystal molecules or positive liquid crystal molecules, and an original alignment direction of the second liquid crystal molecules is perpendicular or parallel to a surface of the third substrate facing the second substrate.

11. The transparent display device according to claim 7, wherein the first liquid crystal layer further contains first stable polymers which are uniformly mixed with the first liquid crystal molecules and whose long chains are aligned in an original alignment direction of the first liquid crystal molecules; wherein the second liquid crystal layer further contains second stable polymers which are uniformly mixed with the second liquid crystal molecules and whose long chains are aligned in an original alignment direction of the second liquid crystal molecules.

12. A method for manufacturing the transparent display panel according to claim 1, said method comprising steps of:
providing the first substrate, the second substrate and the third substrate;
superimposing the first substrate, the second substrate and the third substrate in order, forming a plurality of first pixels distributed in an array between the first substrate and the second substrate, and forming a plurality of second pixels distributed in an array between the third substrate and the second substrate, wherein the plurality of first pixels corresponds to the plurality of second pixels in a one-to-one manner; and
forming a first liquid crystal layer between the first substrate and the second substrate and forming a second liquid crystal layer between the third substrate and the second substrate.

13. The method according to claim 12, wherein the step of forming the first liquid crystal layer between the first substrate and the second substrate and forming the second liquid crystal layer between the third substrate and the second substrate comprises:
mixing polymerizable liquid crystal monomers, the first liquid crystal molecules and a photo initiator uniformly to form a first liquid crystal mixture;
injecting the first liquid crystal mixture between the first substrate and the second substrate;
irradiating the first liquid crystal mixture using ultraviolet (UV) light to form the first liquid crystal layer, wherein the polymerizable liquid crystal monomers are polymerized to form first stable polymers whose long chains are aligned in an original alignment direction of the first liquid crystal molecules;
mixing polymerizable liquid crystal monomers, the second liquid crystal molecules and a photo initiator uniformly to form a second liquid crystal mixture;
injecting the second liquid crystal mixture between the third substrate and the second substrate; and
irradiating the second liquid crystal mixture using UV light to form the second liquid crystal layer, wherein the polymerizable liquid crystal monomers are polymerized to form second stable polymers whose long chains are aligned in an original alignment direction of the second liquid crystal molecules.

14. The method according to claim 12, wherein the step of forming the first liquid crystal layer between the first substrate and the second substrate and forming the second liquid crystal layer between the third substrate and the second substrate comprises:
mixing polymerizable liquid crystal monomers, the first liquid crystal molecules and a photo initiator uniformly to form a first liquid crystal mixture, and mixing polymerizable liquid crystal monomers, the second liquid crystal molecules and a photo initiator uniformly to form a second liquid crystal mixture;
injecting the first liquid crystal mixture between the first substrate and the second substrate and injecting the second liquid crystal mixture between the third substrate and the second substrate; and
irradiating the first liquid crystal mixture and the second liquid crystal mixture using UV light at the same time to form the first liquid crystal layer and the second liquid crystal layer, respectively, wherein the polymerizable liquid crystal monomers in the first liquid crystal mixtures are polymerized to form first stable polymers whose long chains are aligned in an original alignment direction of the first liquid crystal molecules, and the polymerizable liquid crystal monomers in the second liquid crystal mixture are polymerized to form second stable polymers whose long chains are aligned in an original alignment direction of the second liquid crystal molecules.

15. The method according to claim 13, wherein in the first liquid crystal mixture, the polymerizable liquid crystal monomers account for 1% to 5% by mass of the first liquid crystal mixture and the photo initiator accounts for 0.5% to 3% by mass of the first liquid crystal mixture;

in the second liquid crystal mixture, the polymerizable liquid crystal monomers account for 1% to 5% by mass of the second liquid crystal mixture, and the photo initiator accounts for 0.5% to 3% by mass of the second liquid crystal mixture.

16. The method according to claim 12, wherein the method further comprises:

superimposing a first alignment film on a surface of the first substrate facing the second substrate, superimposing a second alignment film on a surface of the second substrate facing the first substrate, superimposing a third alignment film on a surface of the third substrate facing the second substrate, and superimposing a fourth alignment film on a surface of the second substrate facing the third substrate, wherein an alignment direction of the first alignment film and an alignment direction of the second alignment film are identical to an original alignment direction of the first liquid crystal molecules, and an alignment direction of the third alignment film and an alignment direction of the fourth alignment film are identical to an original alignment direction of the second liquid crystal molecules.

17. The transparent display panel according to claim 1 wherein an orthographic projection of the first pixel electrode of a respective first pixel on the third substrate at least partially overlaps with the second pixel electrode of a corresponding second pixel on the third substrate.

* * * * *